United States Patent Office 3,285,972
Patented Nov. 15, 1966

3,285,972
NITROSATION OF PHENOL
Herbert L. Young, Wilmington, Del., assignor to Hercules Incorporated, a corporation of Delaware
No Drawing. Filed Dec. 31, 1962, Ser. No. 248,236
17 Claims. (Cl. 260—621)

This invention relates to the utilization of alkyl and cycloalkyl nitrates as nitrosating agents in the nitrosation of phenol to form p-nitrosophenol. In another aspect, this invention relates to a method for the nitrosation of phenol, utilizing an alkyl, or a cycloalkyl, nitrite as the nitrosating agent under novel pH and solvent conditions, to form p-nitrosophenol at improved conversion and yield levels. In still another aspect, this invention relates to the manufacture of p-nitrosophenyl ethers by reaction of an alcohol, at least partially water-immiscible, with p-nitrosophenol recovered in solution with the said alcohol from the above-described nitrosation, thereby eliminating the need for first isolating the said p-nitrosophenol for further utilization of same.

Various known nitrosation methods have been employed in the past in the manufacture of p-nitrosophenol from phenol. In accordance with one well known procedure, nitrous acid, generated in situ by reaction of aqueous sodium nitrite with sulfuric acid, has been utilized as the nitrosating agent. Another procedure often utilized involves use of nitrosyl chloride as the nitrosating agent.

Alkyl nitrites have been reported as nitrosating agents and can serve as a source of nitrous acid inasmuch as they readily undergo hydrolysis under acid conditions. However, alkyl nitrites have also been used under basic conditions in the nitrosation of phenolic compounds when employing substantially equivalent amounts of base.

This invention is concerned with the utilization of alkyl and cycloalkyl nitrites in the nitrosation of phenol to form p-nitrosophenol under critical alkalinity and solvent conditions providing higher yields and conversions than can be obtained when so employing alkyl nitrites in accordance with techniques of the prior art. The invention is further concerned with the etherification of p-nitrosophenol, so produced, under conditions which eliminate the need for first recovering same as isolated solid p-nitrosophenol product.

In accordance with the invention, a method is provided for the nitrosation of phenol to form p-nitrosophenol in high conversion and yield which comprises reacting phenol with an organic nitrite as the nitrosation agent therefor in the presence of an alcohol as a solvent for the said nitrosation, at a temperature of from 0–100° C., and during the entire period of said nitrosation maintaining the pH of the nitrosation reaction mixture at a value of from 8–13; the said nitrite being characterized by the structural formula RONO wherein R is selected from the group consisting of an alkyl containing from 1–8 carbon atoms and a monocycloalkyl containing from 5–8 carbon atoms, and the said alcohol being characterized by the structural formula ROH where R is an alkyl containing from 1–6 carbon atoms; and recovering p-nitrosophenol as product of the process.

In a now preferred practice of the invention, the nitrosation reaction time is from about 0.25–5 hours, the alcohol solvent is aqueous and has a water content most advantageously within the range of from 20–80 percent, the concentration of phenol in the alcohol solvent is within the range of from about 0.1 to 3 molar (M), and the mole ratio of nitrite reactant to phenol is at least 0.5:1, more generally, 1:1 and higher, say up to about 12:1.

Further in accordance with the invention, p-nitrosophenol is recovered from the above-described nitrosation in solution in an at least partially water-immiscible alcohol, and the resulting solution is acidified to react the p-nitrosophenol and alcohol therein to form the corresponding p-nitrosophenyl ether. This embodiment eliminates the need for isolating the p-nitrosophenol product for further utilization.

The invention is illustrated with reference to the following examples:

*Example 1*

The following materials were charged to a 2-liter jacketed kettle equipped with two graduated addition funnels, a Dry Ice condenser, a thermometer, a Beckman No. 39170 calomel reference electrode, a Beckman No. 41260 glass electrode, and a nickel blade (1" x 5") inserted as a baffle:

| | | |
|---|---|---|
| Phenol (2.0 moles) | g | 188 |
| Sodium hydroxide (0.4 mole) | g | 16 |
| Ethanol | ml | 500 |
| Water | ml | 700 |

290 grams n-butyl nitrite (2.8 moles) diluted with ethanol to a total volume of 400 ml. was added dropwise to the reaction mixture with rapid stirring over a 78-minute period. The temperature of the reaction mixture was maintained at 30° C. by passing hot water through the kettle jacket, and the pH of the reaction mixture was measured with a Beckman Model M pH meter. The pH of the reaction mixture was maintained between 9.5 and 10.5 by the intermittent addition of a total of 200 ml. of 10 M aqueous sodium hydroxide.

A sample of the resulting dark brown homogeneous reaction mixture was taken after 90 minutes and analyzed by ultraviolet spectroscopy. The conversion of phenol to p-nitrosophenol was 90% in a yield of 92%, 2% of the phenol remaining unreacted. A second portion was removed from the reaction mixture after a cumulative time of 115 minutes, and analyzed by UV spectroscopy. The conversion of phenol to nitrosophenol at that time was found to be 92% in a yield also of 92%.

*Example 2*

The following materials were charged to a 2-liter jacketed kettle equipped as described in Example 1:

| | | |
|---|---|---|
| Phenol (1.0 mole) | g | 94.1 |
| Sodium hydroxide (0.2 mole) | g | 8.0 |
| n-Butanol | ml | 900 |
| Water | ml | 300 |

145 grams n-butyl nitrite (1.4 moles) diluted to a total volume of 400 ml. with n-butanol, was added to the reaction mixture dropwise with rapid stirring over an 80-minute period. The temperature of the reaction mixture was maintained at 60° C. by passing hot water through the kettle jacket. pH of the reaction mixture was measured as described in Example 1, and was maintained at 10.8–11.3 by the intermittent addition of a total of 100 ml. of 10 M aqueous NaOH.

A sample of the resulting dark brown homogeneous reaction mixture was taken after 94 minutes and analyzed by ultraviolet spectroscopy. The conversion of phenol to p-nitrosophenol was 78% in a yield of 89%, 12% of the phenol remaining unreacted. Ortho-nitrosophenol was formed in a conversion of 3.6%.

After a cumulative period of 105 minutes, the reaction mixture was poured onto 1000 g. of ice together with 60 ml. 10 M $H_2SO_4$ and the resulting admixture was separated into two liquid phases, i.e., n-butanol phase and aqueous phase. Spectroscopic analysis showed the presence of 0.76 mole p-nitrosophenol and 0.06 mole unreacted phenol in the n-butanol phase, and 0.02 mole p-nitrosophenol, and no phenol in the aqueous phase.

These results demonstrate a conversion of phenol to p-nitrosophenol of 78% in a yield of 83%.

*Example 3*

The following materials were charged to a 200 ml. three-necked, round-bottom flask equipped with an addition funnel, thermometer, Dry Ice condenser, and a Teflon coated magnetic stirring bar:

| | |
|---|---|
| Phenol (0.025) mole) _____g__ | 2.35 |
| Concentrated ammonium hydroxide (15.4 M; 0.154 mole ammonia) _____ml__ | 10 |
| Water _____ml__ | 10 |
| Ethyl alcohol _____ml__ | 5 |

7.7 grams (0.075 mole) n-butyl nitrite in 20 ml. ethyl alcohol was added dropwise with stirring over a 30-minute period. The temperature of the resulting reaction mixture was maintained by immersion of the reaction flask in a water bath at 25° C. and the reaction mixture was stirred magnetically.

A sample for analysis was removed from the dark brown homogeneous reaction mixture after a cumulative period of 167 minutes and analyzed by ultraviolet spectroscopy. The conversion of phenol to p-nitrosophenol was 85% in a quantitative yield, and the amount of unreacted phenol was 17 percent.

*Example 4*

The following materials were charged to a 200 ml. four-necked, round-bottom flask equipped with a Dry Ice condenser, two addition funnels, a Beckman No. 41260 glass electrode, and a Beckman No. 39170 calomel reference electrode:

| | |
|---|---|
| Phenol (0.10 mole) _____g__ | 9.41 |
| Isopropanol _____ml__ | 25 |
| Sodium hydroxide (0.020 mole) _____g__ | 0.80 |
| Water _____ml__ | 35 |

12.5 grams (0.140 mole) isopropyl nitrite diluted to 20 ml. with isopropanol was added dropwise with stirring over 50 minutes. The temperature of the resulting reaction mixture was maintained by immersion of the reaction flask in a water bath at 35° C. and the reaction mixture was stirred magnetically. pH of the reaction mixture was measured as described in Example 1, and was maintained between 10 and 11 by the intermittent addition of a total of 9 ml. of 10 M aqueous sodium hydroxide (0.090 mole NaOH).

A sample was removed from the dark brown homogeneous reaction mixture after 195 minutes and analyzed by ultraviolet spectroscopy. The conversion of phenol to p-nitrosophenol was 82% in a quantitative yield (i.e., 18% of the phenol was unreacted).

*Example 5*

The following materials were charged to a 200 ml. four-necked, round-bottom flask equipped with a Dry Ice condenser, an addition funnel, a Beckman No. 41260 glass electrode, a Beckman No. 39170 calomel reference electrode, and a gas dispersion tube for the introduction of methyl nitrite beneath the surface of the reaction mixture:

| | |
|---|---|
| Phenol (0.100 mole) _____g__ | 9.41 |
| Methanol _____ml__ | 25 |
| Sodium hydroxide (0.020 mole) _____g__ | 0.80 |
| Water _____ml__ | 35 |

Methyl nitrite was generated by the addition of 5.5 ml. (0.10 mole) concentrated sulfuric acid diluted with 11 ml. water to a mixture of 10.7 g. (0.155 mole) sodium nitrite, 7.1 ml. (5.6 g.; 0.175 mole) methanol, and 7 ml. water. The methyl nitrite was added over 1 hour, the rate being controlled by the addition of acid. The temperature of the reaction mixture was maintained by immersion of the flask in a water bath at 30° C., and the reaction mixture stirred magnetically. pH of the reaction mixture was measured as set forth in Example 1 and was maintained between 10 and 10.5 by the intermittent addition of a total of 8 ml. 10 M aqueous sodium hydroxide (0.080 mole).

A sample was removed from the resulting brown-black homogeneous reaction mixture after 120 minutes and analyzed by ultraviolet spectroscopy. The conversion of phenol to p-nitrosophenol was 76% in an 86% yield, 12% of the phenol remaining unreacted.

As above illustrated, an important feature of the invention is the requirement that the pH be at all times within the above-described range of 8–13, and preferably within the range of 9–12. When employing a weak base such as ammonia, regulation within the said pH range is readily controlled by the initial use of an excess of base. However, when employing a strong base such as sodium hydroxide, the basicity is necessarily maintained by the continuous controlled addition of base to the system. Such addition can, of course, be conveniently regulated by pH measurements employing a glass electrode and a calomel reference electrode.

The optimum pH for each alcohol system must be established empirically. This requires that the optimum pH be established for each reaction system although in all instances, the pH value will be within the limits of from 8–13. Thus, employing aqueous n-butanol, containing 25 liquid volume percent water, the best results are achieved at a pH of from 11–11.5 whereas when employing aqueous ethanol as the solvent, and containing 20–80 liquid volume percent water, the best results are obtained when the pH is maintained at about 10. In this latter instance, a pH value above 11 is least advantageous.

In most instances, it will be found that the range of pH values yielding optimum conversion and yield will vary among the different alcohol solvents within the range of about 10–11.5.

The following examples illustrate low conversion and yield obtained when pH of the alkyl nitrite-phenol nitrosation is not controlled so as to remain within the critical pH range of the invention:

*Example 6*

(A) n-Butyl nitrite (14.4 g., 0.14 mole) was added dropwise over 1 hour to a stirred solution of 9.41 g. (0.10 mole) phenol and 0.80 g. (0.020) NaOH (phenol/NaOH molar ratio of 5) in 24 ml. ethanol and 36 ml. water (i.e., 40% aqueous ethanol). The initial pH of 10.2 dropped to 10.0 after 30 minutes, to 6.6 after 45 minutes, to 5.6 after 60 minutes and to 4.5 after 150 minutes. The product was analyzed and conversion and yield data determined as tabulated hereinbelow.

(B) Essentially the same procedure as in Example 6A above was employed, except the n-butyl nitrite (0.14 mole) was added to 9.41 g. (0.10 mole) phenol and 2.0 g. (0.05 mole NaOH (i.e., a phenol/NaOH molar ratio of only 2). The initial pH of 11.0 dropped to 10.4 after 60 minutes, to 7.2 after 75 minutes and to 7.0 after 150 minutes. The product was analyzed and conversion and yield data determined as tabulated hereinbelow.

| Ex. No. | Solvent Composition | | Reaction Time (Hours) | Conversion [1] (Percent) | Yield (Percent) |
|---|---|---|---|---|---|
| | Percent Water | Percent Ethanol | | | |
| 6A | 60 | 40 | 1.5 | 35 | 49 |
| | | | 2.5 | 27 | 34 |
| 6B | 60 | 40 | 1.5 | 46 | 53 |
| | | | 2.5 | [2] 13 | [2] 15 |

[1] Based on phenol reactant. Both nitrosations carried out at 30° C.
[2] Presence of precipitate may have contributed somewhat to these low values, each of which would possibly have been in the order of say, 20 percent.

Although it is not clearly understood why there is criticality in respect of the pH range, it may be that both free phenol and phenoxide ions must be present for nitrosation to take place at a maximum rate. I have found that the nitrosation is at a minimum in the presence of an equivalent or more of strong base, i.e., phenoxide ions alone; and also that with less than an equivalent of base, the nitrosation proceeds but then slows down as the phenoxide ions are replaced by p-nitrosophenoxide ions from the more acidic product. It appears, therefore, that when carrying out the nitrosation process of this invention, the critical pH range provides for optimum ratios of phenol to phenoxide ions for higher conversion and yield. In any event, it is necessary to control the basicity to within the said pH range of 8–18 throughout the entire nitrosation in order to accomplish suitably high yield and conversion.

Although the nitrosation of the invention can be carried out employing the alcohol solvent in anhydrous form, the higher yields and conversions are generally obtained in the presence of water and accordingly, aqueous alcohol solvents are preferred. The following illustrates low yield and conversion obtained in the absence of an alcohol solvent and also the still higher yield and conversions obtained when the alcohol solvent is aqueous and particularly when the alcohol (or water) content of the said solvent is in the range of from about 20–80 percent:

Example 7

A series of runs was made employing ethanol as a solvent for the nitrosation of phenol utilizing n-butyl nitrite as the nitrosating agent. All runs were made at 30° C., the solvent composition being varied from 100 percent water to 100 percent ethanol. In each instance, n-butyl nitrite (0.14 mole) was added over a one hour period to a stirred solution of phenol (0.10 mole) and NaOH (0.02 mole) in 60 ml. of solvent of the composition evaluated. pH of the reaction mixture was maintained at 10–10.5 by the controlled addition of sodium hydroxide in aqueous ethanol, the latter being of the same concentration as the solvent initially used. The results of these runs are as follows:

| Run No. | Solvent Composition, Liquid Volume Percent | | Reaction Time (Hours) | Conversion (Percent) | Yield (Percent) |
|---|---|---|---|---|---|
| | Water | Ethanol | | | |
| 1 | 0 | 100 | 2.8 | 65 | 80 |
| | | | 4.8 | 64 | 83 |
| 2 | 20 | 80 | 2.8 | 75 | 84 |
| | | | 4.8 | 83 | 87 |
| 3 | 40 | 60 | 2.7 | 82 | 86 |
| | | | 3.9 | 85 | 85 |
| 4 | 60 | 40 | 1.5 | 82 | 85 |
| | | | 2.0 | 86 | 88 |
| | | | 2.5 | 86 | 86 |
| | | | 2.8 | 87 | 87 |
| 5 | 80 | 20 | 2.8 | 73 | 79 |
| | | | 4.8 | 78 | 78 |
| 6 | 100 | 0 | 2.8 | 9 | 34 |
| | | | 4.8 | 29 | 60 |

The following is a tabulation of results of runs made employing aqueous dioxane as the solvent in the nitrosation of phenol with n-butyl nitrite. Each run was made at 30° C., the dioxane solvent composition containing varied proportions of water. In each instance, the n-butyl nitrite was added over a one hour period to a stirred solution of phenol (0.10 mole) and NaOH (0.020 mole) in 60 ml. of the solvent composition evaluated. pH of the reaction mixture was maintained at 10–10.5 by the controlled addition of sodium hydroxide in aqueous dioxane, the latter being the same as the solvent composition evaluated.

| Run No. | Solvent Composition, Liquid Volume Percent | | Reaction Time (Hours) | Conversion (Percent) | Unreacted Phenol Reactant |
|---|---|---|---|---|---|
| | Water | Dioxane | | | |
| 7 | 17 | 83 | 2.0 | 1 | ~100 |
| 8 | 36 | 64 | 2.0 | 1 | ~100 |
| 9 | 56 | 44 | 2.0 | 1 | ~100 |

Further exemplary of the nitrite reactants of the invention are n-propyl nitrite, isobutyl nitrite, n-amyl nitrite, 2,3-dimethylbutyl nitrite, n-hexyl nitrite, 2,3-dimethylamyl nitrite, n-octyl nitrite, cyclopentyl nitrite, cyclohexyl nitrite, cycloheptyl nitrite and cyclooctyl nitrite.

Any primary, secondary or tertiary alkyl alcohol containing from 1–6 carbon atoms in the molecule can be employed in the practice of the invention, further exemplary of which are n-propanol, sec-butanol, tert-butanol, n-pentanol, isopentanol, tert-pentanol, n-hexanol. Although alkyl alcohol solvents containing more than 6 carbon atoms can be utilized, they are, when employed under anhydrous conditions, often associated with unduly low conversions and their water solubilities are too low to permit them to effectively function as aqueous alcohol solvents.

Examplary base materials, employed in the practice of the invention, in addition to those set forth hereinabove are alkali metal hydroxides and bicarbonates, e.g., potassium hydroxide and sodium bicarbonate, and tertiary organic amines such as trimethylamine, tributylamine, triisopropylamine, tripropanolamine, triethanolamine, hexamethylene tetramine and alkali metal alkoxides such as sodium butoxide, potassium ethoxide and the like. When referring herein to a weak base, it is meant to denote any base characterized by an ionization constant smaller than $1 \times 10^{-3}$ at 25° C., e.g., ammonium hydroxide, and when referring to a strong base, it is meant to denote any base characterized by an ionization constant greater than the said $1 \times 10^{-3}$, e.g., NaOH.

The rate at which the nitrite reactant is added to the phenol-containing nitrosation mixture is preferably regulated to minimize hydrolysis of the alkyl nitrite. This is generally most advantageously carried out by adding the alkyl nitrite to the nitrosation reaction mixture in small increments generally at regular intervals over a prolonged period. However, under the basic conditions of the nitrosation system, the hydrolysis is sufficiently slow that incremental addition of the nitrite reactant can be dispensed with when desired.

The overall concentration of phenol in the nitrosation reaction mixture is preferably in the range from about 0.3 to 3 molar. Although the reaction proceeds at lower concentrations, such is not desirable from the standpoint of practicability, i.e., so far as commercial operation is concerned. Extension of the concentration beyond one molar may be limited by solubility and is, therefore, dependent upon the particular alcohol solvent. In some instances, the p-nitrosophenol product may precipitate from the reaction mixture in form of the phenolate particularly when a phenol concentration exceeding one molar is employed. So long as the phenol reactant is in solution, precipitation of the product as the phenolate can be tolerated. However, it is preferred that the phenol reactant concentration be within the above described range and that the reaction mixture be homogeneous throughout the reaction period.

Generally, the overall mole ratio of phenol reactant to the nitrite reactant is within the range of from 1:1 to 3:1. It is preferred to conduct the process of the invention utilizing an excess of nitrite in order to achieve a maximum conversion of phenol to p-nitrosophenol. A 20–40 percent molar excess of nitrite is advantageously utilized inasmuch as that amount is generally sufficient to allow for losses due to hydrolysis and other side reactions, and still provide for maximum conversion of the phenol to p-nitrosophenol.

The preferred nitrosation reaction temperature is generally in the range of from about 20 to 70° C. Often, temperatures below 20° C. result in an unduly low reaction rate and temperatures above 70° lead to undesirable side reactions. In many instances, a still more preferred temperature range is from about 25° C. to 50° C.

Time is, of course, dependent upon the particular conditions, particularly temperature, utilized, but is generally within the range of from 0.25 to 3 hours. Longer reaction times may lead to loss of p-nitrosophenol product to various side reactions particularly in the presence of any unreacted alkyl nitrite. However, in the event that longer reaction periods are used, these side reactions can be minimized, often to a large degree, by maintaining the pH of the system at a value in the upper portion of the range, in any event, above 11.

Recovery of p-nitrosophenol product is generally accomplished by neutralization of the alkaline nitrosation reaction mixture, which contains the p-nitrosophenol in form of its salt, and extraction of the resulting free p-nitrosophenol, in the presence of water, and as formed, into a suitable at least partially water-immiscible organic solvent such as a $C_4$–$C_8$ aliphatic or cycloaliphatic alcohol, diethyl ether, or the like, followed by distillation of the resulting p-nitrosophenol-organic solvent solution to recover residual p-nitrosophenol product, at a temperature not exceeding about 50–75° C.—generally under reduced pressure.

Although under the alkaline conditions employed in the practice of the invention, the alkyl nitrite reactant can be expected to undergo hydrolysis, the said hydrolysis is much slower than that obtained under acidic conditions. Consequently, hydrolysis of the alkyl nitrite, under the conditions of the process of the invention, is a minor competing reaction.

The advantages of the present process utilizing the hereindefined nitrites as the nitrosating agent are demonstrated with reference to the high yield and conversion values obtained as compared with those obtained outside the hereindefined range of critical conditions of solvent and pH. The present invention is also advantageous over the procedure heretofore utilized in the generation of nitrous acid in situ such as from sodium nitrite and sulfuric acid. Thus, the present process results in the formation of less than about 4 percent of ortho-nitrosophenol as by-product whereas the in situ process (alkali metal nitrite-sulfuric acid) of the art obtains ortho substitution in the order of double that amount. This points to an improved specificity of the alkyl nitrites under the conditions utilized in the practice of the invention. Further, appreciable amounts of diazonium salts are formed as by-product in carrying out the above said in situ process whereas that side reaction does not occur in the practice of this invention.

As disclosed and claimed in the copending application of Hays et al., Serial No. 17,894, filed March 28, 1960, now U.S. 3,107,264 issued October 15, 1963, p-nitrosophenol has been found to exhibit very slight reactivity with aniline and other amines to form the corresponding p-nitrosophenylamine, whereas if the p-nitrosophenol is first etherified and the resulting ether then reacted with the amine, the corresponding nitrosophenylamine product is formed in high conversion and yield. The etherification of p-nitrosophenol, utilizing a primary or secondary alcohol as the etherification reactant, to form the corresponding p-nitrosophenyl ether, is disclosed and claimed in the copending application of De Butts et al., Serial No. 17,895, filed March 28, 1960, now U.S. 3,170,265 issued October 15, 1963. This invention provides, in another embodiment, for not only the nitrosation above described, but also for the etherification of the p-nitrosophenol so produced without the need for separate recovery of the p-nitrosophenol to be etherified.

In carrying out the nitrosation-etherification embodiment of the invention, an aqueous alcohol is utilized as the nitrosation solvent. Unreacted nitrite reactant is removed from the resulting nitrosation reaction mixture by distillation. When the alcohol solvent is completely water-miscible, it is also removed from the nitrosation reaction mixture, preferably substantially completely, by distillation. When the said alcohol is sufficiently volatile, it is advantageously removed, together with the said nitrite. An aqueous alkaline residual nitrosation reaction product mixture remains. Upon removal of the completely water-miscible alcohol, an alcohol, at least partially water-immiscible, e.g., n-butanol, is added to the said residual aqueous alkaline nitrosation product mixture to form a separate organic phase and to serve as an etherification agent as described hereinafter. On the other hand, when the alcohol solvent for the nitrosation is at least partially water-immiscible, and that alcohol can be utilized as the said etherification agent, it is necessary only to remove the nitrite from the nitrosation reaction mixture to provide a residual alkaline organic (alcohol) phase-aqueous phase mixture. Even though a partially water-immiscible alcohol solvent is utilized in the nitrosation, it can be exchanged for a different partially water-immiscible alcohol as the desired etherification agent, which need not be a member of the class of alcohol solvents utilized in the nitrosation. The exchange can be readily accomplished, say by vacuum distillation of the alcohol nitrosation solvent from the nitrosation reaction mixture followed by addition of the desired alcohol etherification reactant to the residual alkaline nitrosation reaction product mixture.

The resulting organic (alcohol) phase-aqueous phase mixture, i.e., containing the at least partially water-immiscible alcohol, desired as the alcohol reactant in the etherification, is then neutralized by the addition thereto of a neutralizing amount of any protonic acid, preferably a weak acid such as acetic acid. Upon neutralization, the p-nitrosophenol initially present in the said aqueous phase, in form of its salt, is converted to its free form, i.e., to p-nitrosophenol. The salt product of neutralization is then retained in the aqueous phase and the free p-nitrosophenol is extracted from the aqueous phase into the alcohol phase to provide a resulting neutral alcohol (at least partially water-immiscible) solution of free p-nitrosophenol.

Any one of the group of butanols, pentanols, and hexanols can be advantageously utilized as the nitrosation solvent and/or the alcohol reactant in the etherification step. Thus, any one of these alcohols can be employed as the solvent in the nitrosation or alternatively added to the above said residual aqueous alkaline nitrosation reaction product mixture. When the at least partially water-immiscible alcohol in the above said organic phase-aqueous phase mixture is that previously employed as the nitrosation solvent, it is generally supplemented, prior to neutralization, to adjust the relative volumes of alcohol and aqueous phase for facilitating extraction of the free p-nitrosophenol from aqueous phase into the alcohol. The same consideration applies when adding the at least partially water-immiscible alcohol to the above said alkaline residual aqueous mixture, i.e., the amount added is about equivalent to that which would have been present had that alcohol (being added) been that initially utilized as the nitrosation solvent plus a supplementary amount when desired.

The organic phase, thus neutralized, is separated and acidified with a sufficient amount of an acid such as sulfuric acid to serve as a catalyst in the etherification of the p-nitrosophenol with the alcohol of the organic phase serving as the etherification agent in accordance with the method disclosed and claimed in the said copending application Serial No. 17,894.

The resulting acidified organic phase solution can, when desired, be supplied with an additional portion of alcohol the same as already present to serve as a supplemental solvent in the etherification. However, any such additional amount of alcohol is most advantageously introduced into the system just prior to the neutralizatiton as described. In any event, in accordance with the method of the said Serial No. 17,894, the acidified alcohol solution is maintained at a temperature in the order of about 0–150° C. for a period in the order of about 2–500 minutes, under which conditions the etherification proceeds. During at least a portion of the etherification, water of etherification is advantageously removed to shift equilibrium of the reaction to the ether side by vacuum fractional distillation as set forth in the said application Serial No. 17,894 or in accordance with a sparge technique disclosed and claimed in the copending application Serial No. 17,893 and now abandoned. In this manner, conversions in the order of 95 percent and higher can be obtained.

The above said etherification is further advantageously carried out employing a mole ratio of alcohol to p-nitrosophenol within the range of from 1:1 to 100:1 and a mole ratio of the acid catalyst for the etherification to the p-nitrosophenol within the range of from 0.005:1 to 1:1.

Water of etherification can be removed from the etherification reaction mixture in accordance with conventional fractional vacuum distillation means as disclosed and claimed in the above said copending application Serial No. 17,894, although the sparging technique disclosed and claimed in the copending application of De Butts and Espy, Serial No. 17,893, filed March 28, 1960, is most advantageously employed.

Any suitable acid can be utilized in the above said etherification, preferably a strong acid, i.e., one having a dissociation of about $10^{-6}$ or greater. Exemplary acids as catalysts are sulfuric, hydrochloric, phosphoric, p-toluenesulfonic, hydrobromic, hydroiodic, iodic, perchloric, periodic, nitric, benzenesulfonic, methanesulfuric, orthophosphoric, pyrophosphoric, mono-, di-, and tri-chloroacetic and maleic acids; phosphorus pentachloride, titanium tetrachloride, aluminum chloride, boron trifluoride, ferric chloride, acid clays, e.g., silica-alumina, super filtrol, and acid ion exchange resins such as a polymerized sulfonated vinyl benzene, and the like. Solid acid catalysts are particularly advantageously employed in the practice of the etherification as beds, e.g., columnar or layered, in fixed catalyst bed type operation.

Alcohols as organic phase etherification reactants, are those of the class disclosed and claimed in the said copending application Serial No. 17,894 and which are, furthermore, at least partially water immiscible. The general class of alcohol reactants disclosed and claimed in the said Serial No. 17,894 are of the structural formula

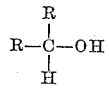

wherein each R is a radical selected from the group consisting of hydrogen, alkyl, alkenyl, alkinyl, phenyl, alkylphenyl, phenylalkyl, alkoxyphenyl, phenylalkenyl, alkoxy, alkyl, hydroxy alkyl, cycloaliphatic, halophenyl, nitrophenyl, furan and tetrahydrofuran, but the said alcohol containing not more than 30 carbon atoms. Further exemplary of this class of alcohols so disclosed and claimed in the said Serial No. 17,894 are n-propyl alcohol, i-butyl alcohol, n-decyl alcohol, lauryl alcohol, tridecyl alcohol, stearyl alcohol, n-octacosanol, ceryl alcohol, cinnamic alcohol, tetrahydrofurfuryl alcohol, furfuryl alcohol, ethylene glycol, glycerol, pentaerythritol, p-octylbenzyl alcohol, p-methylbenzyl alcohol, p-chlorobenzyl alcohol, propargyl alcohol, isopropylpropargyl alcohol, 2-phenyl ethanol p-hexoxybenzyl alcohol, p-methoxybenzyl alcohol, p-nitrobenzyl alcohol, hexamethylene glycol cetyl alcohol, benzyl alcohol, allyl alcohol, oleyl alcohol, sec. amyl alcohl, 2-octyl alcohol and cycohexy alcohol.

p-Nitrosophenyl ethers have various additional especial utilities. They can be reduced to form the corresponding para amine derivative, viz., $NH_2C_6H_5OR$, and they can be condensed in the presence of an alkaline agent to a corresponding azoxy compound, viz., $ROC_6H_5N(O)=NC_6H_5OR$ followed by reduction of the azoxy compound to form the said para amine derivative, both routes to the para amine derivative being as disclosed and claimed in the copending application Serial No. 17,896 filed March 28, 1960, and now Patent No. 3,214,473, and they can be oxidized to the corresponding nitro compound, viz., $NO_2C_6H_5OR$. These products so produced from p-nitrosophenyl ethers are well known chemical intermediates in route to antioxidants and dye stuffs.

The combined nitrosation and etherification in the practice of the present invention is illustrated with reference to the following example:

*Example 8*

(A) *Nitrosation of phenol.*—145 grams n-butyl nitrite (1.4 moles) dissolved in methanol to form a 400 ml. solution is added dropwise over a period of 1½ hours to a stirred solution of 94 g. (1 mole) phenol and 8 g. (0.2 mole) sodium hydroxide in 500 ml. methanol and 700 ml. water. The temperature is maintained at 30° C. The pH of the reaction mixture is maintained at 10–10.5 by the intermittent addition of 100 ml. of 10 M aqueous sodium hydroxide (1 mole sodium hydroxide). After an additional 10–15 minutes (total reaction time: 1¾ hours) the pressure is reduced to about 150 mm. Hg and the methanol and unreacted n-butyl nitrite distilled from the reaction mixture. The bottoms temperature during the distillation is not allowed to exceed 40° C.

(B) *Neutralization and extraction.*—1 liter n-butanol is added to the total reaction mixture which is then neutralized with dilute sulfuric acid. Two phases are formed and the mixture is thoroughly shaken to extract the p-nitrosophenol product (0.9 mole) into the n-butanol phase. Conversion of the phenol to p-nitrosophenol is 90 percent. The phases are separated and the n-butanol solution of p-nitrosophenol is charged to a vacuum distillation reactor.

(C) *Drying and etherification.*—The pressure in the vacuum distillation reactor is then reduced to 30 mm. Hg and the n-butanol phase therein is dried by rapid distillation to a bottoms temperature of 50° C. Heat to the vacuum distillation reactor is then terminated, the vacuum is broken, and the volume of solution is adjusted to 850 ml. (15% by weight p-nitrosophenol) by adding dry n-butanol thereto. 3.3 ml. (0.06 mole) concentrated sulfuric acid is then added dropwise to the n-butanol solution with stirring, and the pressure is then again reduced to 30 mm. Hg together with heating to reflux. The resulting reaction (etherification) mixture is then held under the reflux conditions for 15 minutes after which distillation is initiated. Distillation is continued at 30 mm. Hg pressure with total take-off for 15–20 minutes after which 315 ml. of distillate is stripped from the liquid. Distillation is then continued at a rate of 195 ml. per 15–20 minutes while adding 195 ml. dry n-butanol per 15–20 minutes. After 585 ml. normal-butanol has been added and distilled in this manner, the distillation is terminated. Conversion of n-nitrosophenol to p-nitrosophenyl n-butyl ether as determined by spectroscopic analysis is 85 percent in a yield of 95 percent.

In accordance with a now preferred embodiment of the invention, methanol is employed as the nitrosation alcohol solvent together with n-butyl nitrite as the nitrosation agent. Phenol is added to the alcohol solvent in a concentration therein up to 3 M. An aqueous alkali metal hydroxide, e.g., NaOH, is initially added to the phenol-alcohol mixture in an amount to bring it to a pH in the range of from 10–10.5. n-Butyl nitrite is then added in increments to the methanol-phenol solution over a period of from 0.5 to 1.5 hours at a solution temperature maintained in the order of about 25 to 35° C. 10 M aqueous alkali metal hydroxide is added in increments to the resulting nitrosation reaction mixture to maintain the pH of the said mixture, over the entire nitrosation period, in the range of from 10–10.5.

Unreacted n-butyl nitrite and methanol solvent are then removed from the resulting nitrosation reaction mixture by vacuum distillation. n-Butanol is added to the residual aqueous alkaline nitrosation reaction mixture, i.e., free from n-butyl nitrite and methanol, in a suitable liquid volume ratio thereto in the order of, say, about 0.5:1 to 2:1. The resulting two-phase mixture is then agitated for a period of from about 15–60 minutes with the incremental addition of acetic acid thereto in an amount to effect neutralization of both phases. The two phases, now neutralized, are separated, and the n-butanol phase is vacuum distilled at about 50° C. to provide residual p-nitrosophenol as product of the process.

Alternatively, and as further illustrated hereinabove with reference to the said copending Application 17,895, an acid, e.g., HCl, is added to the neutralized p-nitrosophenol-containing n-butanol phase in a mole ratio to p-nitrosophenol therein in the range of from about 0.005:1 to 0.2:1, and the thus acidified n-butanol phase is maintained at 15–70° C. for a period of up to at least about 2 minutes to form p-nitrosophenyl butyl ether. Aqueous alkali metal hydroxide is then added to the resulting etherification reaction mixture to neutralize same and provide a separate n-butanol phase containing the ether product, which, without need for further processing, can be utilized as an ether reactant with an amine such as aniline, in the amination process disclosed and claimed in copending application Serial No. 17,896, filed March 28, 1960.

As will be evident to those skilled in the art, various modifications can be made or followed, in the light of the foregoing disclosure and discussion, without departing from the spirit or scope of the disclosure or from the scope of the claims.

What I claim and desire to protect by Letters Patent is:

1. A process for the manufacture of p-nitrosophenol which comprises reacting phenol with an organic nitrite as a nitrosation agent therefor in the presence of an alcohol as a solvent for the said nitrosation, at a temperature of from 0–100° C., and during the entire period of said nitrosation, maintaining the pH of the nitrosation reaction mixture by the addition of a base at a value within the range of from 8–13; the said nitrite being characterized by the structural formula RONO wherein R is selected from the group consisting of an alkyl containing from 1–8 carbon atoms and a monocycloalkyl containing from 5–8 carbon atoms, and the said alcohol being characterized by the structural formula ROH wherein R is an alkyl containing 1–6 carbon atoms; and recovering p-nitrosophenol as product of the process.

2. In a process of claim 1, adding a weak base to the said nitrosation reaction mixture in a mole ratio to phenol therein greater than 1:1, whereby during the entire period of said nitrosation, the said pH is maintained within the range of 8–13.

3. In a process of claim 1, adding a strong base, with said phenol and said nitrite, to initially form a resulting nitrosation reaction mixture having a pH not exceeding 13, measuring the said pH during the said nitrosation period and adding a strong base to said nitrosation reaction mixture in increments to maintain the said pH at a value within the said range of 8–13.

4. A process of claim 1 wherein said alcohol solvent is aqueous.

5. A process of claim 4 wherein the water content of said alcohol solvent is from 20 to 80 weight percent.

6. A process of claim 4 wherein the said nitrosation temperature is within the range of from 20–70° C., the said period of nitrosation is from 0.25–3 hours, the concentration of phenol in said alcohol solvent is within the range of from 0.1 to 3 molar, the said nitrite is added to the nitrosation reaction mixture in increments, and the mole ratio of said nitrite to said phenol is at least 1:1.

7. A process of claim 5 wherein the said nitrosation period is longer than 3 hours, the said nitrite is present in molar excess of said phenol, and the said pH is maintained at a value above 11.

8. In a process of claim 1 maintaining the said pH within the range of 10–11.5.

9. In a process of claim 8 reacting methyl nitrite as said nitrite reactant in the presence of methanol as said alcohol solvent.

10. In a process of claim 8 reacting isopropyl nitrite as said nitrite reactant in the presence of isopropanol as said alcohol solvent.

11. In a process of claim 8 reacting n-butyl nitrite as said nitrite reactant in the presence of n-butanol as said alcohol solvent.

12. A process for the nitrosation of phenol to produce a resulting liquid p-nitrosophenol-containing phase suitable as charge for conversion of said p-nitrosophenol in the presence of an acid catalyst to the corresponding p-nitrosophenyl ether, which comprises reacting phenol with an organic nitrite as a nitrosation agent therefor in the presence of an aqueous alcohol as a solvent for the said nitrosation, at a temperature of from 0–100° C., and during the entire period of said nitrosation, maintaining the pH of the nitrosation reaction mixture by the addition of a base at a value within the range of from 8–13; the said nitrite being characterized by the structural formula RONO wherein R is selected from the group consisting of an alkyl containing from 1–8 carbon atoms and a monocycloalkyl containing from 5–8 carbon atoms, and the said alcohol being characterized by the structural formula ROH wherein R is an alkyl containing 1–6 carbon atoms; recovering aqueous nitrite-free, nitrosation product from said nitrosation, as a separate phase in contact with an organic phase comprising an alcohol at least partially water-immiscible and selected from the group consisting of primary and secondary alcohols, and neutralizing said aqueous and organic phases whereby free p-nitrosophenol is formed and is extracted from said aqueous phase into said organic phase to form said liquid p-nitrosophenol-containing phase.

13. A process of claim 12 wherein prior to said neutralizing, said alcohol solvent is vacuum distilled from the resulting nitrosation reaction mixture and is replaced by adding to the residual aqueous phase an at least partially water-immiscible alcohol selected from the group of primary and secondary alcohols to thereby provide said organic phase.

14. A process for the nitrosation of phenol to produce a resulting liquid p-nitrosophenol-containing phase suitable as charge for conversion of said p-nitrosophenol in the presence of an acid catalyst to the corresponding p-nitrosophenyl ether, which comprises admixing phenol with a molar excess of an organic nitrite and an aqueous completely water-miscible alcohol in an amount to contain said phenol in a concentration therein of from 0.1–3 molar as a solvent for the nitrosation, and during the entire period of said nitrosation maintaining the pH of the nitrosation reaction mixture by the addition of a base at a value within the range of from 8–13; the said nitrite being characterized by the structural formula RONO wherein R is selected from the group consisting of an alkyl containing from 1–8 carbon atoms and a monocycloalkyl containing from 5–8 carbon atoms, and said alcohol being characterized by the structural formula ROH wherein R is an alkyl containing up to 3 carbon atoms; subsequent to the said period of nitrosation, vacuum distilling unreacted nitrite and said alcohol solvent from the nitrosation reaction mixture and adding to the residual aqueous nitrosation reaction mixture an alcohol at least partially water-immiscible and selected from the group consisting of primary and secondary alcohols, in amount to form an organic phase separate from the said residual aqueous reaction mixture portion; and neutralizing the alkalinity of the said organic and aqueous phase portions, whereby free p-nitrosophenol is formed and is extracted from said aqueous phase into said organic phase to form said liquid p-nitrosophenol-containing phase.

15. A process for the nitrosation of phenol to produce a resulting liquid p-nitrosophenol-containing phase suitable as charge for conversion of said p-nitrosophenol in the presence of an acid catalyst to the corresponding p-nitrosophenyl ether, which comprises admixing phenol with a molar excess of an organic nitrite and an aqueous alcohol, selected from the group consisting of primary and secondary alcohols and at least partially water-immiscible, in an amount to contain said phenol in a concentration therein of from 0.1 to 3 molar as a solvent for the nitrosation, and during the entire period of said nitrosation maintaining the pH of the nitrosation reaction mixture by the addition of a base at a value within the range of from 8–13; the said nitrite being characterized by the structural formula RONO wherein R is selected from the group consisting of an alkyl containing from 1–8 carbon atoms and a monocycloalkyl containing from 5–8 carbon atoms, and said alcohol being characterized by the structural formula ROH wherein R is an alkyl containing not more than 6 carbon atoms; subsequent to the said period of nitrosation removing unreacted nitrite from the nitrosation reaction mixture by vacuum distillation to provide a residual alcohol phase-aqueous phase nitrosation reaction mixture and neutralizing the alkalinity of the said residual nitrosation reaction mixture, whereby free p-nitrosophenol is formed and is extracted from said aqueous phase into said alcohol phase to form said liquid p-nitrosophenol-containing phase.

16. A process of claim 15 wherein said at least partially water-immiscible alcohol is n-butanol, and wherein additional n-butanol is added to the residual n-butanol in said aqueous phase prior to said neutralizing.

17. A process of claim 15 wherein prior to said neutralizing, said organic phase is supplemented by an additional portion of alcohol the same as the said alcohol solvent.

References Cited by the Examiner

UNITED STATES PATENTS 3,107,265  10/1963  De Butts et al. _____ 260—612

OTHER REFERENCES

Walder: Ber. Deut. Chem. Gesellschaft, vol. 17–I (1884) pp. 399–401.

LEON ZITVER, *Primary Examiner.*

B. HELFIN, *Assistant Examiner.*

UNITED STATES PATENT OFFICE
CERTIFICATE OF CORRECTION

Patent No. 3,285,972                             November 15, 1966

Herbert L. Young

It is hereby certified that error appears in the above numbered patent requiring correction and that the said Letters Patent should read as corrected below.

Column 5, line 12, for "8-18" read -- 8-13 --; column 7, lines 69 and 70, for "U.S. 3,170,265" read -- U.S. 3,107,265 --; column 10, line 63, for "n-nitrosophenol" read -- p-nitrosophenol --.

Signed and sealed this 12th day of September 1967.

(SEAL)
Attest:

ERNEST W. SWIDER                                    EDWARD J. BRENNER
Attesting Officer                                          Commissioner of Patents